Aug. 24, 1954  R. F. BRADY  2,687,420
PROCESS FOR THE NEUTRALIZATION OF SULPHONATED
PRODUCTS SUITABLE AS DETERGENTS
Filed Jan. 8, 1951
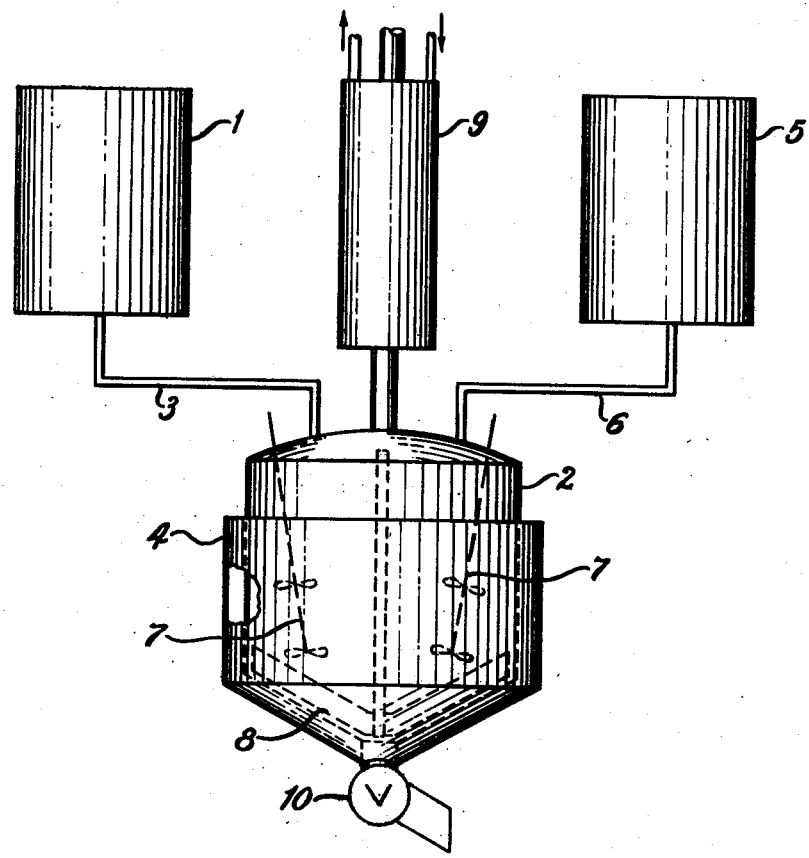
INVENTOR.
ROBERT FRANCIS BRADY
BY
George H. Mortimer
ATTORNEY Patented Aug. 24, 1954

2,687,420

UNITED STATES PATENT OFFICE 2,687,420

PROCESS FOR THE NEUTRALIZATION OF SULFONATED PRODUCTS SUITABLE AS DETERGENTS

Robert Francis Brady, Earlwood, New South Wales, Australia, assignor to Colgate-Palmolive Company, a corporation of Delaware Application January 8, 1951, Serial No. 204,977

14 Claims. (Cl. 260—400)

This invention relates to an improved process for the preparation of salts of organic sulphuric acid reaction products suitable as detergents which have low inorganic salt content.

In recent times very effective detergents have been produced by the sulphonation of various types of organic compounds, such as the higher alcohols, monoglycerides of higher fatty acids, alkyl aromatic hydrocarbons, etc. As to whether the sulphonic acid group or the sulphuric acid ester group is introduced is largely dependent upon the molecular structure of the raw material and the conditions under which the sulphonation is carried out. The sulphonation is normally carried out with such agents as sulphuric acid, oleum or chlorosulphonic acid and it is usual to use an excess of such agents. This excess, as well as the sulphonated product itself, must be neutralized at the conclusion of the reaction in order to obtain a usable product. The known methods of effecting the neutralization have not proved to be perfectly satisfactory from a manufacturing point of view as will be explained hereinafter.

In one known process the sulphonation reaction mixture and a strong aqueous alkali hydroxide solution (30% caustic soda solution) are flowed through separate feed lines directly into a stream of previously neutralized material in approximately the proportions required for neutralization, the amount of alkali hydroxide solution added being controlled by an automatic pH control unit. This process has some disadvantages from a manufacturing point of view in that the pH must be controlled within very strict limits when neutralizing hydrolyzable sulphonic acids to prevent excessive degradation of the sulphonated product. In addition the neutralized sulphonated product contains a relatively large proportion of inorganic salt which has to be separated in whole or part for certain uses of the organic sulphonate. Thus, in the production of dental creams, shampoos and cosmetics it is desirable that the detergent product be substantially free from any undesirable compounds, such as sodium sulphate, formed during the neutralization. The apparatus required for carrying out the above process is somewhat complex and the necessity of providing an automatic pH control unit increases the cost.

The disadvantages of the above described process have been removed to some extent by another known process in which the neutralization of the sulphonation reaction mixture is carried out in an organic solvent with a neutralizing agent which is insoluble or only slightly soluble in the solvent. The neutralizing agent, which is normally a carbonate or bicarbonate, is suspended in the organic solvent in the form of a thick slurry which is difficult to stir. The inorganic salt formed during neutralization precipitates as solid particles, making separation somewhat difficult. In addition the reaction between the sulphonation mixture and the neutralizing agent produces carbon dioxide which in the presence of the detergent tends to form a foam. The cost of the process, moreover, is considerably increased in that there is a substantial loss of organic solvent which is entrained with the carbon dioxide. The amount of solvent lost in this way is considerable.

The object of the present invention is to provide a process for the neutralization and purification of sulphonated products suitable as detergents which process is substantially free of the disadvantages of the above described processes.

It is also an object of the present invention to provide a neutralization and purification process which is relatively simple to operate as compared with existing processes and which can be carried out in simpler apparatus without the need for expensive pH control equipment.

According to the present invention a process for the neutralization of acid mixtures containing a sulfonated organic product selected from the group consisting of organic sulfonic acids and sulfuric acid esters and excess sulphonating agent comprises the steps of feeding separate streams of such a mixture and neutralizing agent into an aqueous organic solvent solution which causes the formation of two immiscible liquid phases, and separating the two liquid phases formed at the conclusion of the reaction. One of the liquid phases contains substantially all of the neutralized sulfonated organic product dissolved in the organic solvent. The other liquid phase contains substantially all of the neutralized excess sulphonating agent in the water of the aqueous organic solvent solution. There are only small proportions of water and inorganic salt in the one phase and small proportions of organic solvent and organic sulphonate in the other phase. The rates of feed of the streams of the acid mixture and of the neutralizing agent are preferably so proportioned that the neutralization reaction mixture remains substantially neutral. It is advantageous, particularly where the organic sulphonic acid is subject to hydrolysis, to control the temperature by cooling the neutralization reaction mixture.

The process of the present invention can be employed to neutralize any acid mixture containing a sulfonated organic product selected from the group consisting of organic sulfonic acids and sulfuric acid esters and excess sulphonating agent to yield an organic sulphonate substantially free of inorganic salt. Acid mixtures of this type are formed in sulphonating organic compounds which, when neutralized, are useful as detergents since excess sulphonating agent is necessary to drive the sulphonation reaction to substantial completion. The invention is particularly advantageous for the neutralization of sulfonated organic products which are subject to hydrolysis in alkaline solutions, such as sulphuric acid esters of monoglycerides of higher fatty acids, since substantial hydrolysis is readily prevented by control of the temperature of the neutralization reaction mixture and the relative rates of feed of the acid mixture and neutralizing agent into it so as to maintain essentially neutral conditions.

Sulphonation reaction mixtures which may be neutralized by the present process to form useful detergents include those which contain sulphuric acid esters of polyhydric alcohol esters of higher fatty acids such as monoglycerides of coconut oil fatty acids, glycol monostearate, glyceryl monolaurate, etc.; those which contain sulfuric acid esters of higher fatty alcohols such as lauryl, oleyl and cetyl alcohols as well as mixtures such as are derived by reduction of fats and oils such as tallow, coconut oil, etc.; those which contain sulphonic acids of alkyl aryl hydrocarbons such as dodecyl benzene, decyl naphthalene, tridecyl toluene, keryl benzene, etc.; those which contain sulphonic acids of alkylolamides of higher fatty acids such as monoethanolamides of coconut oil fatty acids; etc. In general organic compounds which are effective detergents contain an alkyl group having from 8 to 24 carbon atoms, and those with an alkyl group of 10 to 18 carbon atoms are particularly useful. Sulphonic acids of all such compounds which are prepared by the use of a sulphonating agent such as chlorosulphonic acid or sulphuric acid of any suitable strength including oleum and sulphuric acid anhydride may be neutralized by the process of the present invention.

Any alkaline compound which will react with the excess sulphonating agent and the sulphonated product to produce salts of each may be used in the present process. However, it is preferable that the neutralization take place without the production of any gaseous products and that the neutralizing agent be soluble to a substantial extent in water. The alkaline compounds such as sodium hydroxide, potassium hydroxide, ammonium hydroxide, and amines, e. g., monoethanolamine and triethanolamine and ammonia gas, may be used as the neutralizing agent. Ammonium hydroxide is to be preferred.

Any organic solvent which will dissolve the neutralized sulfonated organic product and form, with the other ingredients, the desired two phase liquid system may be used in the present process. The following solvents and mixtures are satisfactory, although the list is not to be considered exhaustive: ethanol, propanol, isopropanol, n-butanol, tertiary butanol, n-hexanol, acetone, dioxane, ethylene glycol monoethyl ether (Cellosolve), diethylene glycol monoethyl ether (Carbitol), and monoglyceride of coconut oil fatty acids. It should be noted that not all of the organic solvents which function in this process are miscible with water alone, e. g., n-hexanol, but the water-immiscible ones may become sufficiently soluble, if not completely miscible, in the aqueous sulphonate solution for the purpose of this invention. The preferred solvents are the low molecular weight monohydric alcohols, particularly ethanol and isopropanol.

The proportion of organic solvent to water which is required to effect the formation of two liquid phases varies with the percentage of solids. In general the proportion of solvent increases as the percentage of solids decreases. The minimum proportion of solvent to water required to effect phase formation in the neutralization of any particular sulphonation reaction mixture can be readily determined by routine tests at any particular solids concentration and temperature by making an aqueous solution of the neutralized reaction mixture of the predetermined concentration and at the predetermined temperature and adding the solvent until phase separation occurs. Preferably a somewhat higher proportion of solvent than the minimum is used. In general a solids concentration of about 15 to 40% of the water is satisfactory, although with certain solvents, e. g., ethanol, the proportion of solids must be at least about 20% before phase formation can be effected. By using an aqueous solvent solution of predetermined proper proportions of water and solvent, and by introducing the acid mix and neutralizing agent into the solution in the manner described, the neutralization reaction mixture at the conclusion of the reaction exists as two immiscible liquid phases which may be separated by subsidence, centrifugation, or the like. The phase of lower density is the organic solvent solution of the neutralized organic sulphonate while the phase of higher density is the aqueous solution of the inorganic salt (sulphate) formed during the neutralization.

The neutralization is carried out at temperatures not exceeding 150° F. and preferably between 70° and 130° F. At temperatures in excess of 150° F. excessive degradation of the neutralized sulphonated product occurs with the result that the detergent power of the product is reduced by the presence of a quantity of fatty or oily material.

The invention will be better understood by reference to the following examples although it is not intended that it should be limited thereto.

*Example I*

315 pounds of water and 150 pounds of 95% ethyl alcohol are charged into a neutralizing vessel fitted with stirring means and a water jacket for external cooling and 2 pounds of 26° Bé. ammonium hydroxide added. 464 pounds of an acid sulphonation reaction mixture containing sulphuric acid esters of monoglycerides of coconut oil fatty acids and excess sulphuric acid in a proportion of about 1:2 parts by weight, respectively and 330 pounds of 26° Bé. ammonium hydroxide are then added gradually and proportionately over a period of 2½ hours, which method necessarily keeps the solution substantially neutral or very slightly alkaline. The solution is thoroughly agitated by the stirring means during the addition of these materials. The temperature of the reaction mixture is permitted to rise to but not exceed 130° F. When the addition of the reactants is complete the neutralized product together with the alcohol and the aqueous ammonium sulphate is permitted to settle into two liquid layers. The bottom layer, consisting of the aqueous ammonium sulphate solution is run off and discarded. The upper layer comprising a 50% aqueous alcoholic solution of the neutralized sulphonated material after filtering, if necessary, is then ready for use in the manufacture of shampoos, detergent compositions and similar preparations. The product so obtained has an ether soluble content of about 6% (solids basis) which is unsulphonated fatty material.

*Example II*

The process of Example I is repeated with the sole difference that the temperature of the solution is permitted to rise only to 90° F. The ether soluble content of the product obtained is approximately 2% (solids basis).

*Example III*

147 pounds of water and 40 pounds of isopropyl alcohol are charged into a neutralizing vessel and 127 pounds of sulphonation reaction mixture of the same type as Example I and 226 pounds of 30% caustic soda solution are then added gradually and proportionately which method maintains the reaction mixture substantially neutral. The temperature is permitted to rise to a maximum of 90° F. When the addition is complete the temperature is raised to 110° F. whereupon the mixture separates into two layers. The bottom layer containing the sodium sulphate is run off and discarded. The upper layer containing the neutralized sulphonated product is suitable after removing the alcohol by distillation for use in the manufacture of dental creams, shampoos and cosmetics.

If ethyl alcohol is used in place of isopropyl alcohol it is not necessary to distil the solution. However, a more concentrated detergent solution is obtained if isopropyl alcohol is used.

Suitable apparatus in which the neutralization process of the present invention can be effected is shown diagrammatically in the accompanying drawings.

The reaction mixture from the sulphonation process is stored in a calibrated scale tank 1 and the neutralizing agent in a calibrated scale tank 5. The neutralizing vessel 2 is provided with an external water jacket 4, two propeller type agitators 7 and a larger slow moving impeller 8. The vessel is also provided with a water cooled reflux condenser 9 and at its lower end with an exhaust valve 10.

The sulphonated product and the neutralizing agent are run into the vessel 2, in sufficient proportion to maintain the mixture in the vessel substantially neutral, through transfer lines 3 and 6, the volume of material run into the vessel 2 being gauged by means of sight glasses (not shown) fitted to the tanks 1 and 5.

At the conclusion of the reaction the mixture is permitted to separate into two layers, the bottom of which is run off through the exhaust valve 10.

While the neutralizing process and the apparatus has been described with particular reference to a batchwise process it will be obvious that the process could be operated continuously with suitable apparatus.

The process of the present invention is particularly suitable for the neutralization of sulphonated products suitable as detergents in that the final neutralized product is substantially neutral and free from undesirable diluents. The solution of the ammonium neutralized product in aqueous ethanol is particularly suitable without further treatment for use in shampoos, detergent compositions, cosmetics and the like.

The apparatus required to carry out the process is comparatively simple as compared with that necessary to carry out the known neutralization processes. Furthermore the strict control of pH necessitating the use of an automatic pH control unit is not essential. The ether soluble content of the neutralized product of hydrolyzable organic sulphonic acids can be readily controlled by controlling the temperature at which the reaction is carried out.

Having thus described and illustrated the invention, what is claimed is:

1. A process for the neutralization of an acid mixture containing a sulphonated organic product selected from the group consisting of organic sulfonic acids and sulfuric acid esters together with excess sulfonating agent to prepare a salt of the sulfonated organic product substantially free of inorganic salt which comprises feeding separate streams of said acid mixture and neutralizing agent into a solvent solution containing water and organic solvent, the rate of feed of the stream of neutralizing agent being proportioned to the rate of feed of the stream of acid mixture such that the resultant neutralization reaction mixture remains substantially neutral, said water and organic solvent being present in sufficient amounts whereby two immiscible liquid phases form, one of said liquid phases having substantially all the neutralized sulfonated organic product dissolved therein and the other liquid phase having substantially all the neutralized excess sulfonating agent dissolved therein, and separating the said liquid phases.

2. A process as set forth in claim 1 in which the temperature of the neutralization reaction mixture is controlled.

3. A process as set forth in claim 2 in which the temperature of the neutralization reaction mixture is maintained within the range of 70° to 150° F.

4. A process as set forth in claim 2 in which the temperature of the neutralization reaction mixture is maintained within the range of 70° to 130° F.

5. A process as set forth in claim 1 in which the organic solvent is a lower monohydric alcohol having 2 to 6 carbon atoms per molecule.

6. A process as set forth in claim 5 in which the alcohol is ethanol.

7. A process as set forth in claim 5 in which the alcohol is isopropanol.

8. A process as set forth in claim 1 in which the neutralizing agent is a solution of a hydroxide.

9. A process as set forth in claim 8 in which the hydroxide is amonium hydroxide.

10. A process as set forth in claim 8 in which the hydroxide is sodium hydroxide.

11. A process as set forth in claim 1 in which the sulphonated organic product is the sulphuric acid ester of coconut oil fatty acid monoglycerides.

12. A process as set forth in claim 1 in which the sulphonated organic product is the sulphuric acid ester of higher fatty alcohols.

13. A process as set forth in claim 11 in which the temperature of the neutralization reaction mixture is maintained below 90° F.

14. The process of neutralizing an acid mixture containing a sulphonated organic product selected from the group consisting of organic sulphonic acids and sulfuric acid esters and excess sulfonating agent to prepare a salt of the sulphonated organic product substantially free of inorganic salt and without solid salt precipitation which comprises establishing a solvent solution containing a material which is a common solvent for both the neutralized sulphonated organic product and the neutralized excess sulfonating agent and a material which is a selective solvent for the neutralized sulphonated organic product, introducing into said solution a stream of said acid mixture and a stream of neutralizing agent to cause the formation of two immiscible liquid layers, the rate of feed of the stream of neutralizing agent being proportioned to the rate of feed of the stream of acid mixture such that the resultant neutralization reaction mixture remains substantially neutral said solvent materials being present in sufficient amounts such that one of said liquid layers contains substantially all of the neutralized sulphonated organic product dissolved therein and the other liquid layer contains substantially all the neutralized excess sulfonating agent dissolved therein, separating the said liquid layers, and recovering the neutralized sulphonated organic product from the solvent.

References Cited in the file of this patent

UNITED STATES PATENTS

| Number | Name | Date |
|---|---|---|
| 2,285,337 | Kapp et al. | June 2, 1942 |
| 2,303,582 | Russell et al. | Dec. 1, 1942 |
| 2,316,719 | Russell et al. | Apr. 13, 1943 |
| 2,511,043 | Busch | June 13, 1950 |